Feb. 4, 1969   H. KRAINER ET AL   3,425,380
TANK AND METHOD OF MANUFACTURING SAME
Filed Oct. 27, 1964

Inventors:
Helmut Krainer
Reinhard Müller
Wolfhard Reich
By: Spencer & Kaye
ATTORNEYS

United States Patent Office

3,425,380
Patented Feb. 4, 1969

3,425,380
TANK AND METHOD OF MANUFACTURING SAME
Helmut Krainer, Essen, and Reinhard Müller and Wolfhard Reich, Essen-Bredeney, Germany, assignors to Beteiligungs- und Patentverwaltungs-G.m.b.H., Essen, Germany
Filed Oct. 27, 1964, Ser. No. 406,857
Claims priority, application Germany, Nov. 15, 1963, B 74,287
U.S. Cl. 113—120           17 Claims
Int. Cl. B21d 51/24; F17c 1/04

ABSTRACT OF THE DISCLOSURE

A method of building a large tank made of shells surrounding a core, wherein each shell is made of axially adjacent rings which are formed by bending sheet metal strips around a core, or a previously completed shell, and welding the edges of the strips together to form ring junctures. The ring junctures of adjacent rings of each shell are out of alignment with each other, and the ring junctures and also the circumferential edges of the rings of successive shells are out of alignment with each other.

---

The present invention relates to the manufacture of shell-type walls for large, mainly cylindrical or conical tanks.

Considerable difficulties have been encountered in the manufacture of large steel receptacles or tanks, for example, tanks having a diameter of from 10 to 20 meters, if such tank is to be able to withstand very high internal pressures of the order of, for example, 50 to 100 superatmospheres, particularly if the tank is additionally to be able to withstand relatively high temperatures of the order of, for example, 350° C. This will be the case, for example, where the tank is to be used in conjunction with nuclear reactors. Such tanks have to have relatively thick walls, and experience has shown that a number of engineering difficulties arise when such tanks are to be manufactured. One problem which arises relates to the fact that there is the danger that the tank may rupture or break as a result of brittleness, and another problem which arises involves the costs incident to the manufacture of such tanks.

According to one known type of process, multiple layer containers are formed by helically winding sheet metal strips onto a core. This, however, makes it necessary for the receptacle to be rotatably mounted, and this, in the case of receptacles of a diameter such as the present invention is concerned with, can no longer be carried out economically.

It is also known to manufacture multiple-layer receptacles by providing a number of pre-formed cylindrical shells, each of which has a longitudinal slot, the shells being slipped into each other in a telescopic manner such that the longitudinal slots overlap each other, thereby to form a deep and wide slot which is then closed by a weld.

It will thus be appreciated that there exists a need for providing a practical and economically feasible method of building very large tanks, and it is, therefore, the primary object of the present invention to provide a way in which this is accomplished. Accordingly, the present invention relates to a method for making the shell wall of a large steel tank, this being done by superimposing upon each other two or more shells, and the present invention resides primarily in the fact that, for forming each of the shells except the innermost ones, wide, and initially rectilinearly held sheet metal stripes having a length corresponding to the circumference of the shell being made, are bent about a previously made and hence an already existing shell which is immediately below, such that the strips abut each other tightly and are elastically deformed. The ends of each sheet metal ring which is thus formed are then welded together in a seam by means of a three-element welded seam which also joins the ends of the ring with the shell which is immediately below. The peripheral seams between the sheet metal rings are then welded such that the seams of the individual rings which make up any one shell are out of alignment with respect to each other, the arrangement being such that there is no overlapping of welded seams of different shells.

In practice, it is expedient if the sheet metal strips are mounted on the already existing shell under pre-tension or bias. This initial stress can be obtained by heating the strips and placing them about the shell while they are hot, and immediately providing the welded seam. In order to relieve the welded seams of a load, the strips may have their ends cut obliquely such that the seam between the ends and hence the ring juncture seam, will form, with the generatrix of the shell surface, an angle which is substantially different from zero.

Additional objects and advantages of the present invention will become apparent upon consideration of the following description when taken in conjunction with the accompanying drawings in which.

Figure 1:
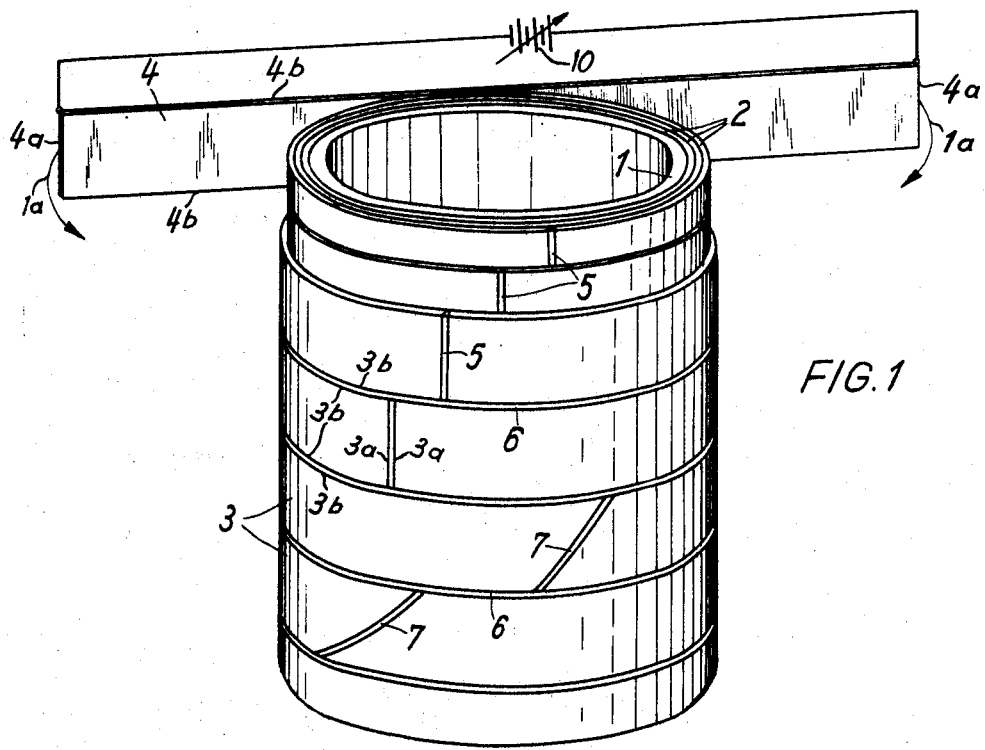
FIGURE 1 is a front perspective view showing the manufacture of a large tank according to the present invention.
Figure 2:
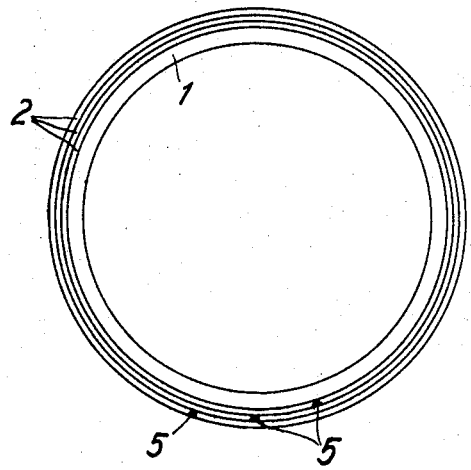
FIGURE 2 is an end view of the tank.

Referring now to the drawing, the same shows the manufacture of a large container or tank having the configuration of a circular cylinder. For purposes of simplicity, the bottom and top of the tank are not shown.

Here it should be noted that the present invention is not limited to the construction of cylindrical receptacles, but can be used for building any other type of receptacle having a developable surface, as, for example, a conical or frustoconical configuration. Here, the bottom surface can, for example, be elliptical or have any other suitable shape. Nor is it essential that the receptacle be a straight cylinder, in that the receptacle can be an oblique cylinder or cone. Accordingly, the term "cylindrical" or "circular" as used throughout the instant specification and the appended claims, is intended to refer to any of the above developable configurations.

The wall of the container comprises an inner shell, hereinafter referred to as the core, which is conventionally constituted by a hollow steel cylinder 1, this cylinder 1 being surrounded by a plurality of overlapping cylindrical shells 2. The cylinder 1 and the shells 2 are, in a manner of speaking, nested one within the other.

Each of the shells 2 is constituted by a plurality of sheet metal rings 3 which abut each other closely in axial direction. Each ring 3 is constituted by a relatively wide and thin piece of sheet metal 4, the width of each sheet being a fraction of the axial length of the tank. In practice, the sheets will be as wide as is commercially available, for example, up to 2 meters, while the thickness of the sheet will be, for example, of the order of 10 millimeters.

The innermost shell 2, i.e., the shell which immediately encompasses the core cylinder 1, is formed by successively placing the sheets 4 against the cylinder 1 while the sheets 4 are straight, i.e., held generally rectilinearly. The sheets are then elastically deformed and bent about the core 1 as shown by the arrows 1a. In practice, the sheets 4 will, in the region of their end edges 4a and prior to their being bent about the core, be arched so as to have a curvature mating with that of the surface of the core onto which the shell is to be placed, so as to make certain that the sheets 4 will lie flush against the core 1. The length of the sheets 4 will be so selected that each sheet wholly surrounds the core 1 except a small part thereof so as to form a gap or juncture at the end edges 3a of what are now rings 3. This juncture is then closed with a so-called three-element welded seam constituted by a seam 5, which is generally parallel to the axis of the tank. The seam 5 joins the end edges 3a of each ring 3 to each other as well as with the steel cylinder 1. After all of the sheets 4 have been placed about the cylinder 1, the longitudinal edges of each sheet 4b, now constituting circumferential edges 3b, will be welded to each other, and preferably also with the steel core 1, by means of circumferential seams 6, i.e., by means of further three-element welded seams which extend circumferentially and join two rings 3 and the core 1.

The arrangement of the individual rings 3 is such that the several seams 5 of the shell are mutually displaced with respect to each other, i.e., the seams 5 are angularly displaced about the circumference so that the junctures of adjacent rings are out of alignment with each other.

In order to pre-stress the sheets 4, so that they will be applied to the core 1 under tension, the sheets 4 may, prior to being bent about the core 1, be pre-heated. This can, in practice, be done by causing an electric current to flow through the sheets. This is shown by the variable power source 10.

After the first shell 2 has been assembled about the core 1, a further shell 2 is placed about the first shell. This second shell is made in the same way as the first shell. It will be appreciated that any desired number of shells 2 may thus be applied, with each further shell being placed so as to nest about and encompass an existing shell. Here, the individual rings 3 of the several shells will be so arranged that neither the axial seams 5 nor the circumferential seams 6 of any one shell overlap, lengthwise, the seams of another shell.

The edges of the sheets to be welded will, preferably, be pre-heated prior to being welded; in practice, the ring juncture will be welded immediately after the respective shell has been bent about the core so that the edges of the sheet will still be hot as the result of the heat applied for pre-stressing purposes.

The receptacle will preferably be manufactured step by step. In order to avoid the difficulties incident to the testing of assembly-line produced welded seams, the axial seams between the end edges 3a of the ring 3 will not extend strictly parallel to the axis of the tank but will, instead, be inclined so as to form an angle with a generatrix of the shell surface. This is accomplished by cutting the ends of the sheets 4 not at right angles to the length of the sheets but obliquely thereto. This will then produce seams 7 which will form an appreciable angle with the generatrix, for example, an angle of 30°.

In practice, the sheets 4 can have a higher tensile strength or yield strength than the steel cylinder constituting the core 1. In this way, the elastic stress of the steel cylinder 1 can, upon the application of a suitable internal pressure, be increased by autofrettage.

It has been found that the present invention produces a number of advantages over heretofore known methods of constructing large receptacles. For one thing, the method allows the use of relatively thin and therefore inexpensive sheets. Furthermore, it is no longer necessary to pre-form the individual sheet matel shells so that the hot-pressing of the sheets is eliminated. Furthermore, the amount of welding is reduced, because the individual welded seams can be produced with relatively small welded volume and because the thin sheets which are delivered to the assembly site can have a large surface area so that, for a given shell surface, the number of seams is reduced. Furthermore, a tank produced in accordance with the present invention is especially proof against rupture due to brittleness. Moreover, thin sheets which are used in the method according to the present invention, will generally have greater tensile and other strength than thick steel shell portions.

It will be understood that the above description of the present invention is susceptible to various modifications, changes and adaptations, and the same are intended to be comprehended within the meaning and range of equivalents of the appended claims.

What is claimed is:

1. In a process of making a large, generally circular tank which is built up of nested shells of which the innermost one is constituted by a core, a method of making a plurality of individual shells which surround the core, said method comprising the steps of:
  (a) placing an elongated metal sheet, while the same is held generally rectilinearly, against the periphery of an existing shell about which a further shell is to be placed, said sheet having a width which is a fraction of the axial length of the tank being built and the length of said sheet being substantially equal to the circumferential length of that portion of the existing shell about which said sheet is to be placed;
  (b) elastically deforming said sheet for bending it about the existing shell thereby to form a ring which encompasses the existing shell, said ring having a juncture whereat the end edges of said ring meet;
  (c) welding the end edges of said ring to each other as well as to the existing shell;
  (d) repeating steps (a), (b) and (c) for providing a plurality of axially closely adjacent rings about the existing shell, all of which rings themselves are part of the further shell being made, the junctures of adjacent rings of each shell being out of alignment with each other;
  (e) welding the circumferentially extending edges of adjacent rings to each other; and
  (f) repeating steps (a), (b), (c), (d), and (e) for providing a still further shell about a previously constructed shell, the ring juncture welds and the circumferential edge welds of successive shells being out of alignment with each other.

2. The method defined in claim 1 wherein said sheets are pre-stressed prior to being bent about the existing shell.

3. The method defined in claim 2 wherein said sheets are pre-stressed by heating them, in which heated state they are bent about the existing shell, and wherein the ring juncture is welded immediately afterwards.

4. The method defined in claim 3 wherein said heating is effected by passing an electric current through the sheet.

5. The method defined in claim 2 wherein the end edges of the sheet, prior to their being welded, are preheated.

6. The method defined in claim 1 wherein the end edges of the sheets extend at approximately right angles to the direction of the lengths thereof, in consequence of which the ring junctures extend substantially parallel to the axis of the tank being built.

7. The method defined in claim 1 wherein the end edges of the sheets are oblique with respect to the direction of the lengths thereof, in consequence of which the ring junctures are inclined with respect to a generatrix of the wall surface of the tank being built.

8. The method defined in claim 1 wherein said sheets are, in the region of their end edges and prior to their being bent about an existing shell, arched so as to have a curvature mating with that of the surface of the existing shell onto which the new shell is to be placed.

9. The method defined in claim 1 wherein, during step (e), the circumferentially extending edges of adjacent rings are also welded to the existing shell.

10. The method defined in claim 1 wherein said sheets have a higher yield strength than the core.

11. The method defined in claim 10, comprising the further step of applying internal pressure to said core for subjecting the same to autofrettage.

12. In a process of making a large, generally circular tank which is built up of nested shells of which the innermost one is constituted by a core, a method of making a plurality of individual shells which surround the core, said method comprising the steps of:
(a) placing each of a plurality of individual, elongated metal sheets, while the same are held generally rectilinearly, against the periphery of an existing shell about which a further shell is to be placed, each sheet having a width which is a fraction of the axial length of the tank being built and the length of each sheet, measured rectilinearly, being substantially equal to the circumferential length of that portion of the existing shell about which the repective sheet is to be placed;
(b) elastically deforming each sheet for bending it about the existing shell thereby to form rings which encompass the existing shell, said rings being closely adjacent to each other and each ring having a juncture whereat the end edges of the respective ring meet, the junctures of adjacent rings being out of alignment with each other;
(c) welding the end edges of each ring to each other as well as to the existing shell; and
(d) welding the circumferentially extending edges of adjacent rings to each other;
(e) the sheets which are to constitute each new shell that is placed about the outermost existing shell being positioned with respect thereto such that the ring juncture welds and the circumferential welds of successive shells are out of alignment with each other.

13. In a process of making a large, generally circular tank which is built up of nested shells, a method of making one of said shells, said method comprising the steps of:
(a) placing each of a plurality of individual elongated metal sheets, while the same are held generally rectilinearly, against the periphery of an existing shell about which a further shell is to be placed, each sheet having a width which is a fraction of the axial length of the tank being built, and the length of each sheet, measured rectilinearly, being substantially equal to the circumferential length of that portion of the existing shell about which the further shell is to be placed;
(b) elastically deforming each sheet for bending it about the existing shell thereby to form a ring which encompasses the existing shell, said rings being closely adjacent to each other and each ring having a juncture whereat the end edges of the respective ring meet, the junctures of adjacent rings being out of alignment with each other;
(c) welding the end edges of each ring to each other as well as to the existing shell; and
(d) welding the peripherally extending edges of adjacent rings to each other.

14. A large, generally circular tank, comprising, in combination:
(a) a core; and
(b) a plurality of nested shells surrounding said core, each of said shells incorporating a plurality of axially adjacent rings each of which rings consists of a strip of sheet metal whose end edges are welded to each other to form a ring juncture and to the immediately adjacent core or shells, the ring juncture welds being inclined with respect to a generatrix of the particular shell of which the respective ring is a part and the ring juncture welds of adjacent rings of each shell being out of alignment with each other, the circumferential edges of each ring also being welded to the immediately adjacent core or shells, and the ring juncture welds and the circumferential edge welds of the rings of successive shells being out of alignment with each other.

15. A tank as defined in claim 14 wherein said rings have a higher yield strength than said core.

16. A large, generally circular tank, comprising, in combination:
(a) a core; and
(b) a plurality of nested shells surrounding said core, each of said shells incorporating a plurality of axially adjacent rings each of which rings consists of a strip of sheet metal which has a higher yield strength than said core and which, in the case of the innermost shell, is elastically deformed about said core and, in the case of the remaining shells, is elastically deformed about the immediately adjacent inner shell, the end edges of each strip being welded to each other to form a ring juncture and to the immediately adjacent core or shells, the ring juncture welds of adjacent rings of each shell being out of alignment with each other, the circumferential edges of each ring also being welded to the immediately adjacent core or shells, and the ring juncture welds and the circumferential edge welds of the rings of successive shells being out of alignment with each other.

17. A tank as defined in claim 16 wherein said ring juncture welds are inclined with respect to a generatrix of the particular shell of which the respective ring is a part.

References Cited

UNITED STATES PATENTS

| | | | |
|---|---|---|---|
| 1,916,051 | 6/1933 | Jagschitz | 113—120 |
| 1,965,736 | 7/1934 | Dillman | 113—120 |
| 2,600,630 | 6/1952 | Fergusson | 220—3 |
| 2,786,435 | 3/1957 | Ellzey | 72—181 |

CHARLES W. LANHAM, *Primary Examiner.*

R. D. GREFE, *Assistant Examiner.*

U.S. Cl. X.R.

220—3